United States Patent [19]
Martinez

[11] 4,236,191
[45] Nov. 25, 1980

[54] ILLUMINATED MUSICAL INSTRUMENT

[76] Inventor: Fredy R. Martinez, Box 7308 Barrio Obrero Sta., Santurce, P.R. 00916

[21] Appl. No.: 872,576

[22] Filed: Jan. 26, 1978

[51] Int. Cl.² ............................................. F21V 7/04
[52] U.S. Cl. ...................................... 362/32; 362/29; 362/86
[58] Field of Search ...................... 362/32, 31, 29, 84, 362/86, 95, 255, 249, 251, 28, 29; 84/464, 464 A

[56] References Cited

U.S. PATENT DOCUMENTS

| | | | |
|---|---|---|---|
| 3,324,755 | 6/1967 | Canonico | 84/464 A |
| 3,710,091 | 1/1973 | Holcomb | 362/32 |
| 3,943,815 | 3/1976 | Gilbert | 84/464 A |
| 4,060,722 | 11/1977 | Foley | 362/32 |

*Primary Examiner*—Benjamin R. Padgett
*Assistant Examiner*—J. L. Barr
*Attorney, Agent, or Firm*—Marvin Feldman; Stephen E. Feldman

[57] ABSTRACT

Grooves or channels are formed along the edges, and/or at other selected locations, of a guitar, of other musical instruments; as might be done in purfling and binding for such instrument. A fiber-optic bundle is laid into the groove and overlayed with a veneer of suitable wood, or other appropriate materials, but in such a manner that ends of selected fibers are aligned with and/or extend through suitable apertures formed through the veneer overlay. The individual fiber-optic bundles are then gathered into a main fiber-optic trunk line which is directed through an entry channel and away from the instrument; terminating at a source of illumination. The source of illumination includes a light source in the form of a conventional light bulb and a color wheel formed with sections of different colors which are successively interposed between the light source and the end of the fiber-optic bundle; such that light from the light source passes through each colored section and illuminates the fibers of the bundle with the color of that section of the wheel. The light travels along the fibers and shows at the fiber ends distributed around the instrument. The wheel is such that it rotates due to the heat generated by the light bulb, but a suitable motor and controls may also be provided to rotate the color wheel. Appropriate controls are also provided to vary the intensity of the light and to otherwise control same.

11 Claims, 4 Drawing Figures

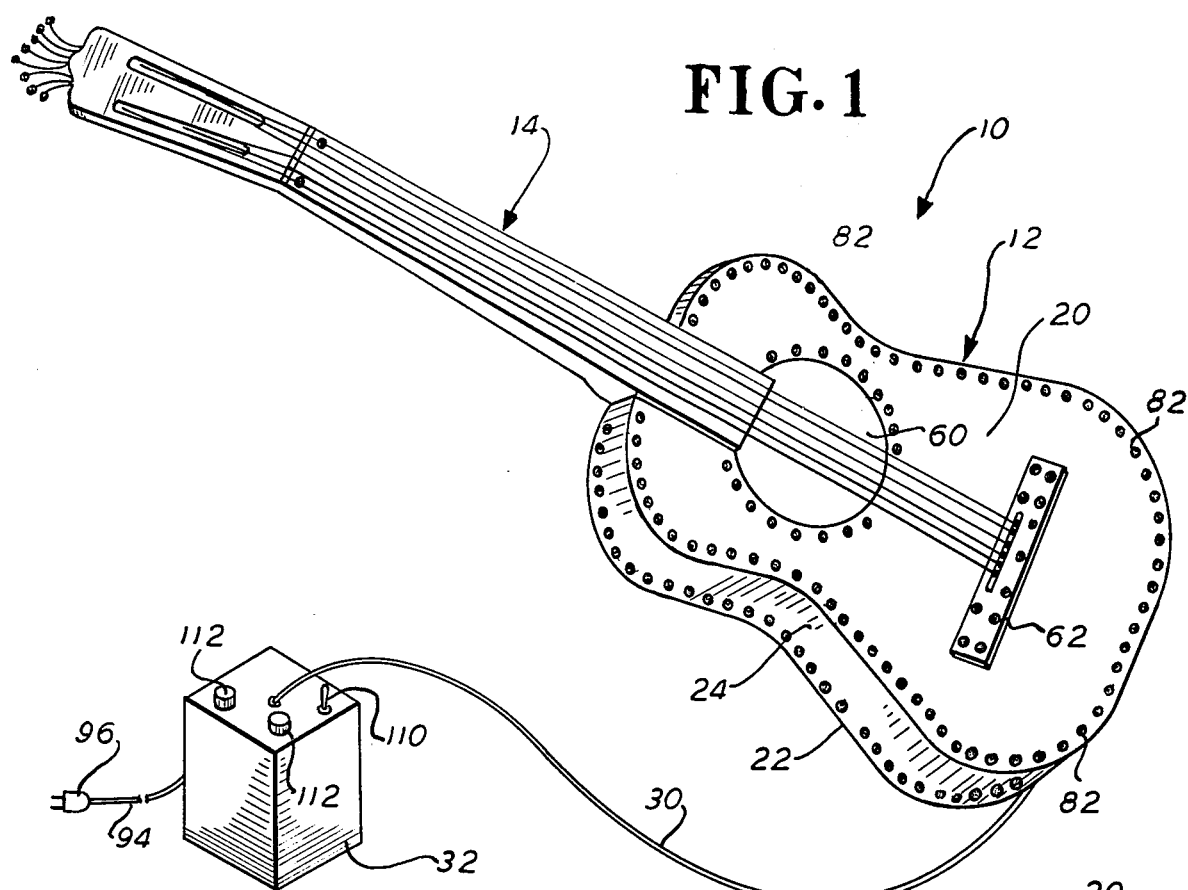
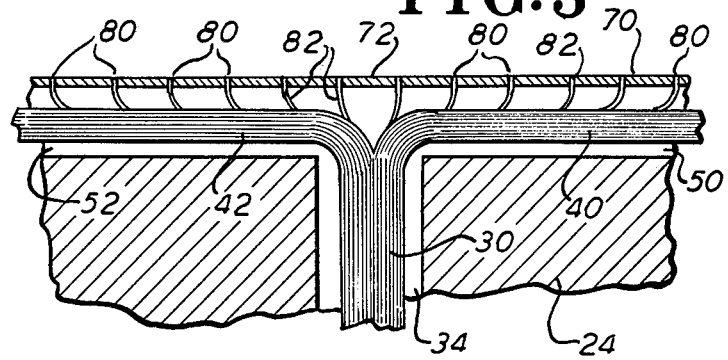
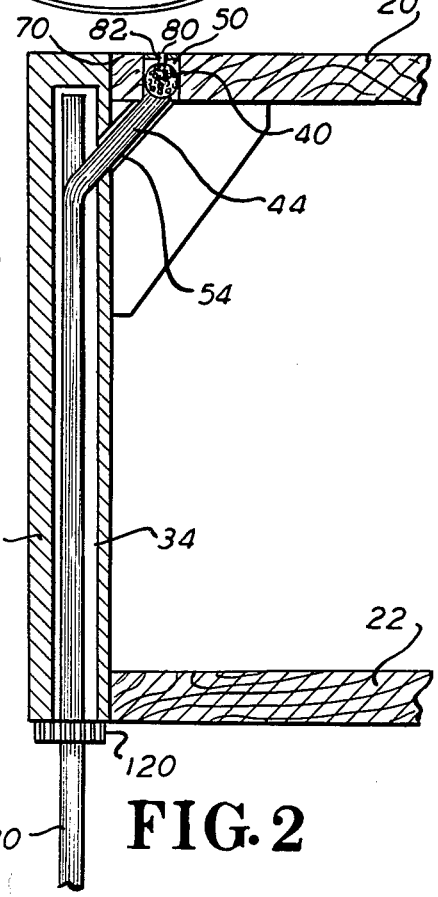

ILLUMINATED MUSICAL INSTRUMENT

BACKGROUND OF THE INVENTION-FIELD OF APPLICATION

This invention relates to musical instruments; and more particularly to decoration and ornamentation for such musical instruments.

BACKGROUND OF THE INVENTION-DESCRIPTION OF THE PRIOR ART

Most musical instruments present a pleasing and aesthetic appearance due to the materials from which they are made or the natural shape of the instrument itself. However, when an instrument is to be utilized in the world of show business it is often desirable to make the instrument otherwise outstanding. In doing so, the instrument may be painted with designs or have designs otherwise applied as by decal. Some instruments have designs applied by using sequins. However, decals, painting, and sequins may rub off in the normal course of using the instrument. If only a part of the design wears off the instrument will look quite shabby and will not be presentable for public use. Refinishing the design can be very expensive and will place the instrument out of service. In addition, many instruments are played in a dark or dimly lit atmosphere and most of the available designs and decorations will only show up advantageously in a well lit environment.

SUMMARY OF THE INVENTION

It is therefore an object of this invention to provide a new and improved musical instrument.

It is another object of this invention to provide a new and improved decorative design for a musical instrument.

It is yet another object of this invention to provide a new and improved illuminated decorative design for a musical instrument.

It is yet a further object of this invention to provide a new and improved method of decorating a musical instrument.

It is yet still a further object of this invention to provide a new and improved method of decorating a musical instrument with multi-colored and illuminated lights.

This invention involves musical instruments and contemplates embedding in the material of the instrument, at selected stratigic locations, fiber-optic bundles such that first ends of the individual fibers are disposed in a predetermined array and configuration; and such that the other ends of the fibers are disposed in a bundle and proximate a source of illumination. When the source of illumination is turned on, the light appears at said first ends of the individual fibers to present to the viewers an aesthetically pleasing illuminated design on and about the musical instrument.

Other objects, features, and advantages of the invention in its details of construction and arrangement of parts will be seen from the above, from the following description of the preferred embodiment when considered with the drawings and from the appended claims.

BRIEF DESCRIPTION OF THE DRAWING

In the drawing:

FIG. 1 is a perspective showing of a musical instrument, in the form of a guitar, incorporating the instant invention;

FIG. 2 is a partial vertical sectional view of the end of the guitar showing the fiber-optic bundle connection to the instrument;

FIG. 3 is a partial vertical sectional view showing the disposition of individual fibers of the fiber-optic bundle of FIG. 2; and FIG. 4 is a perspective schematic showing of the source of illumination for the illuminated guitar of FIG. 1.

DESCRIPTION OF THE PREFERRED EMBODIMENT

For convenience the invention will be described as applied to a musical instrument in the form of a guitar that has been grooved as in purfling operation. Fiber-optic bundles are set into the grooves with individual fibers extended into apertures formed through a veneer overlaying the grooves and the fiber-optic bundle disposed therein. The bundles are gathered into a main trunk which is, in turn, disposed in proximity to a multi-colored wheel illuminated by a light bulb. It should be understood, nevertheless, that without departing from the scope of this invention, that the musical instrument need not be a guitar but may be a mandolin, violin, viola, bass fidel, or the like; that the grooves or channels may be formed by any convenient and appropriate method; that the illumination may be white, any particular color, or of many colors as desired.

With reference to FIG. 1, there is generally shown at 10, a musical instrument in the form of a guitar having a main portion or body 12 from which there extends a neck or finger board 14. Body 12 includes a top surface or table 20, bottom surface 22 and peripheral or side surface 24 all to the normally guitar configuration. A fiber-optic trunk or main bundle 30 extends from a source of illumination 32 into an entry passageway 34 (FIG. 2) formed in side surface 24 of guitar 10.

Fiber-optic trunk or main bundle 30 is, in turn, divided into a plurality of fiber-optic sub-bundles 40, 42, 44 which are layed into grooves or channels 50, 52, 54. Grooves 50, 52, 54 may be formed by the conventional process known as purfling or by any other convenient and appropriate method. Such grooves 50, 52, 54 are formed about the upper periphery of guitar 10, about the periphery of side wall 24 proximate bottom wall 22, at the far end of neck 14, about the periphery of sound hole 60, and at any other suitable location such as at area 62 of top surface 20.

After grooves 50, 52, 54 have been cut into their respective surfaces the fiber-optic bundles 40, 42, 44 etc., are layed in place and covered over by a covering surface 70, 72, etc., of wood veneer; or such fiber-optic bundles are disposed in place by other and appropriately suitable covering means. Apertures 80 are formed in a predetermined array through covering surface 70, 72 and ends 82 of individual fibers are either threaded therethrough or are otherwise disposed in proximity thereto.

Main bundle 30 is suitably connected to source of illumination 32 which is provided with a light bulb 90 disposed in a socket 92 electrically interconnected to a conductor 94 fitted with a plug 96 for interconnection to a source of suitable power. A line switch 98 is provided in conductor 94 for turning source of illumination 32 on and off. A color wheel 100 carrying a plurality transparent colored areas 102 formed of glass or suitable plastic, is mounted for rotation proximate light bulb 90. Wheel 100 is formed in conventional manner to rotate in response to the heat given off by bulb 90. Alternatively, wheel 100 can be disposed for co-operation with a motor (not shown) and with suitable controls to provide for rotation of wheel 100. Suitable switches 110 and controls 112, 114, are provided for source of illumination 32 to control the intensity of light bulb 90 and other characteristics of the light from source 32.

In utilizing the device source of illumination, 32 is interconnected to guitar 10 by main bundle 30 which may be secured to guitar 10 by an adjustable member 120 (FIG. 2). Source of illumination 32 is then plugged into a source of electricity and switch 98 turned on. Light travels from bulb 90 through the individual elements of the various fiber-optic bundles; appearing at ends 82 all about guitar 10. As wheel 100 rotates, the color of the light changes providing a very pleasing and aesthetic effect about guitar 10.

From the above description it will thus be seen that there has been provided a novel and improved decoration for a musical instrument which decoration illuminates a selected and predetermined pattern on and about the instrument in a pleasing and aesthetic manner.

It is understood that although I have shown the preferred form of my invention that various modifications may be made in the details thereof without departing from the spirit as comprehended by the following claims.

I claim:

1. The method of decorating a musical guitar instrument; comprising:
   (a) providing purfling grooves in said guitar;
   (b) disposing a fiber-optic bundle along a predetermined path in said purfling groves to follow the guitar shape and in proximity to a predetermined surface of said guitar instrument;
   (c) disposing the separate ends of individual fibers of said fiber-optic bundle adjacent the surface of said instrument so that light carried by said individual fibers will be directed towards said predetermined surface of said musical instrument;
   (d) providing a source of illumination for said fiber-optic bundle; and
   (e) illuminating said fiber-optic bundle and said ends of said individual fibers to thereby illuminate in a decorative manner said musical instrument.

2. The method of decorating a musical instrument of claim 1, including disposing a covering surface over said grooves after said fiber-optic bundles are disposed therein.

3. The method of decorating a musical instrument of claim 2, including providing apertures through said covering surface proximate said ends of said individual fibers.

4. The method of decorating a musical instrument of claim 3, including threading individual ends of said fibers each through one of said apertures.

5. The method of decorating a musical instrument of claim 4, including forming said predetermined path proximate the edges of said musical instrument.

6. The method of decorating a musical instrument of claim 1, including providing a means for changing the color of the light illuminating said fibers of said fiber-optic bundle.

7. The method of decorating a musical instrument of claim 6, including providing said means for changing the color of the light by providing a color wheel in proximity to said source of illumination.

8. The method of decorating a musical instrument of claim 7, including forming said color wheel with a plurality of individual and different colors.

9. The method of decorating a musical instrument of claim 8, including providing means to rotate said color wheel.

10. A decorated musical guitar instrument; comprising:
    (a) a musical guitar instrument and a fiber-optic bundle disposed along a predetermined path in purfling grooves to follow the guitar shape and in proximity to a predetermined surface of the guitar;
    (b) said surface being formed with means to separately receive ends of said fibers so that light carried by said fibers will be directed towards said predetermined surface of said musical instrument;
    (c) a source of illumination for said fiber-optic bundle to illuminate said fiber-optic bundle and said ends of said individual fibers to thereby illuminate in a decorative manner said musical instrument; and
    (d) further comprising means to provide a plurality of individual and different colors to the ends of said individual fibers.

11. The musical instrument of claim 10, said means to provide colors being disposed outside the instrument and being connected to the instrument by said fiber-optic bundle.

* * * * *